Aug. 20, 1968 R. C. GOODWIN 3,397,622

BAGS

Original Filed May 5, 1965 8 Sheets-Sheet 1

Ralph C. Goodwin,
Inventor.
Koenig, Senniger, Powers and Leavitt,
Attorneys.

Aug. 20, 1968  R. C. GOODWIN  3,397,622

BAGS

Original Filed May 5, 1965  8 Sheets-Sheet 2

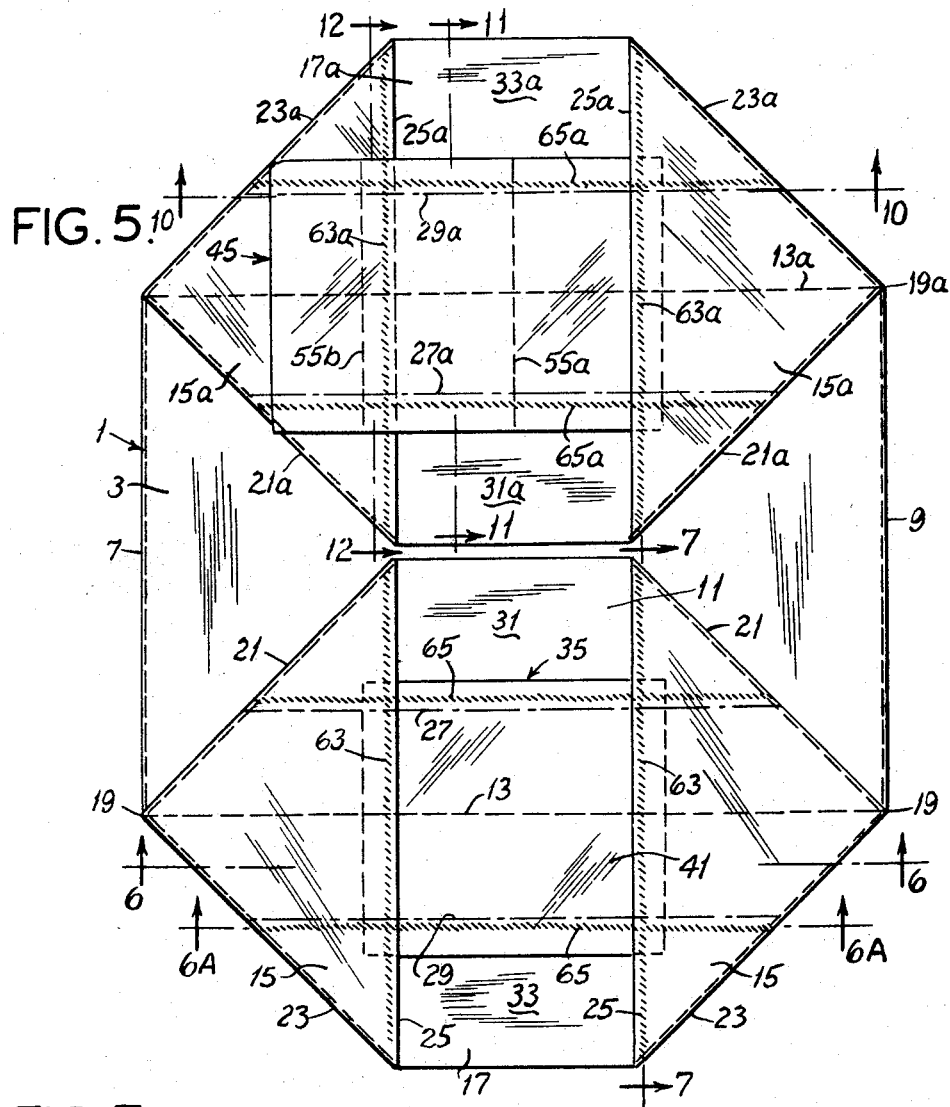
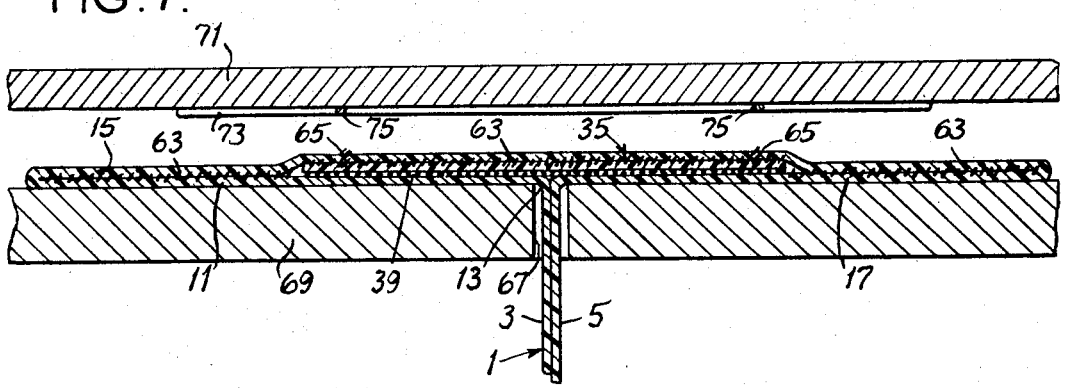

Aug. 20, 1968   R. C. GOODWIN   3,397,622
BAGS
Original Filed May 5, 1965   8 Sheets-Sheet 4

Aug. 20, 1968  R. C. GOODWIN  3,397,622

BAGS

Original Filed May 5, 1965  8 Sheets-Sheet 5

Aug. 20, 1968   R. C. GOODWIN   3,397,622
BAGS
Original Filed May 5, 1965   8 Sheets-Sheet 6
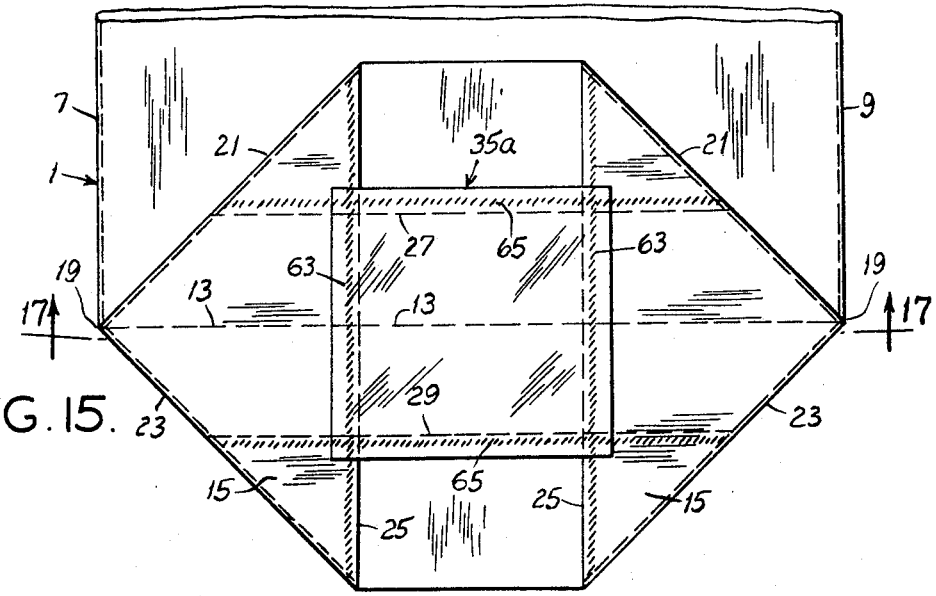
FIG. 15.
FIG. 16.
FIG. 17.
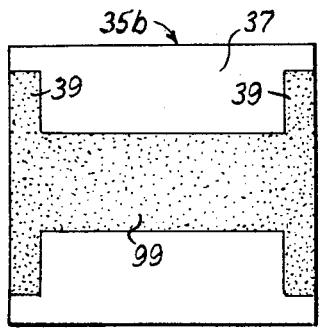
FIG. 18.
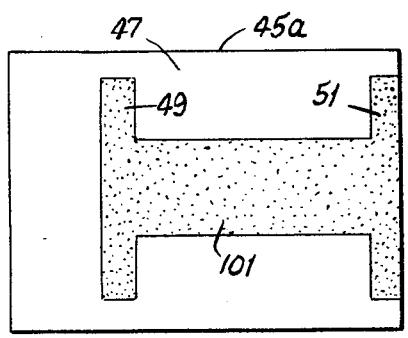
FIG. 19.
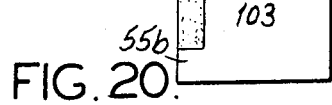
FIG. 20.

United States Patent Office 3,397,622
Patented Aug. 20, 1968

3,397,622
BAGS
Ralph C. Goodwin, Wayzata, Minn., assignor to Bemis Company, Inc., Minneapolis, Minn., a corporation of Missouri
Original application May 5, 1965, Ser. No. 453,247, now Patent No. 3,129,376, dated Dec. 13, 1966. Divided and this application Oct. 19, 1966, Ser. No. 587,723
22 Claims. (Cl. 93—35)

This application is a division of my copending application, Ser. No. 453,247, filed May 5, 1965, now Patent No. 3,129,376, issued Dec. 13, 1966. This invention relates to methods of making bags, and more particularly bags made of flexible heat-sealable sheet plastic material such as polyethylene.

Among the several objects of this invention may be noted the provision of methods for economically manufacturing in quantity production improved plastic bags, and more particularly heavy-duty polyethylene bags for powdered or granular or like material, having end closures adapted when the bags are filled to square off, i.e., to assume a rectangular form; the provision of methods of manufacturing bags such as described wherein the end closures are heat-sealed without any blocking thereof due to the heat-sealing; and the provision of a method of manufacturing a bag with such an end closure having a valve for filling purposes. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated:

FIG. 5 is a view similar to FIG. 1 showing the insert of FIGS. 2 and 2A applied to the bottom of FIG. 1 and the insert of FIGS. 3 and 3A and the valve flap of FIGS. 4 and 4A applied to the top of FIG. 1, and further showing certain heat seals that are made;

Figure 1:
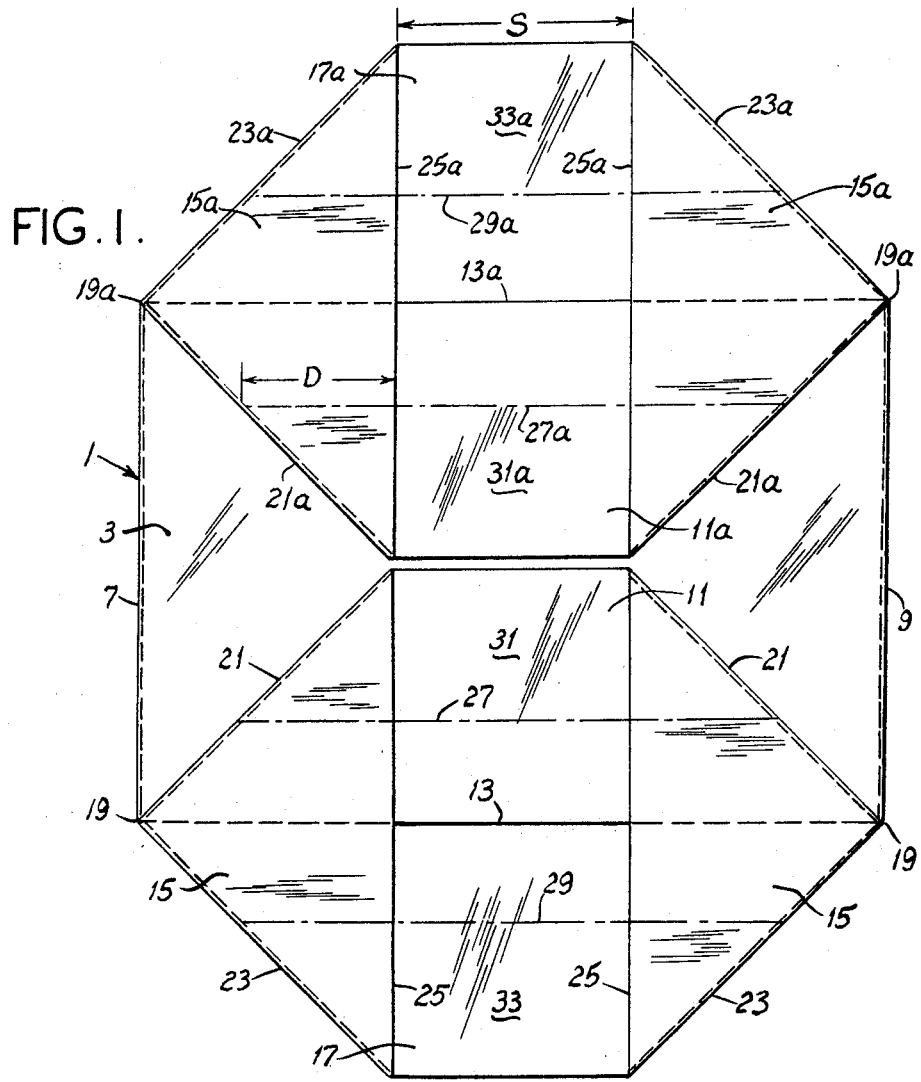
FIG. 1 is a view in elevation of a flat bag tube from which a bag of this invention is made with the ends of the tube opened up for the formation of diamond-fold bottom and top closures.
Figure 2:
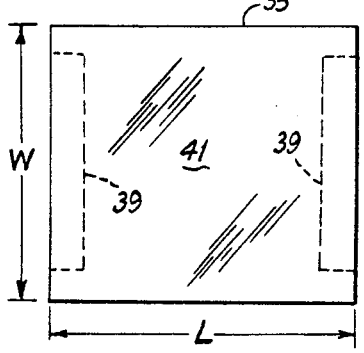
FIGS. 2 and 2A are views of opposite faces of a bottom closure insert.
Figure 2A:
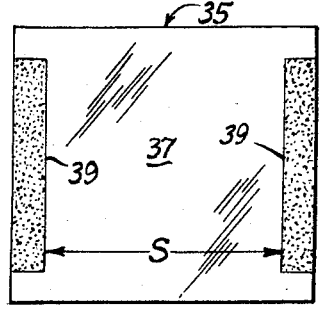
Figure 3:
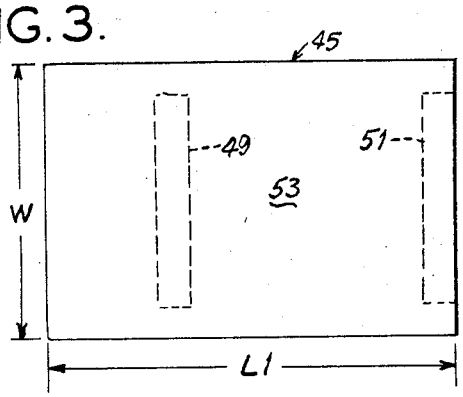
FIGS. 3 and 3A are views of opposite faces of a top closure insert.
Figure 3A:
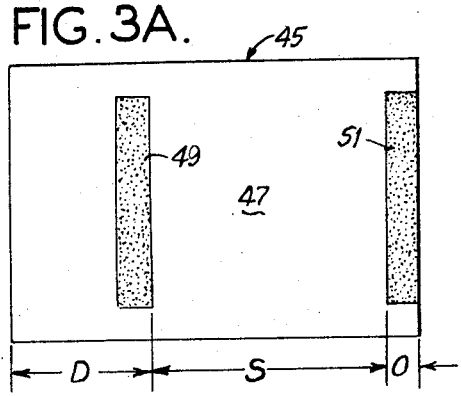
Figure 4:
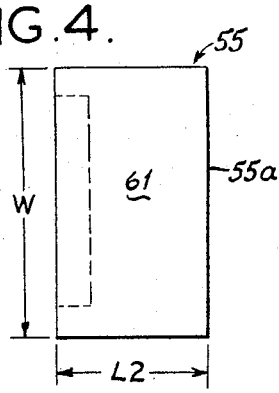
FIGS. 4 and 4A are views of opposite faces of a valve flap.
Figure 4A:
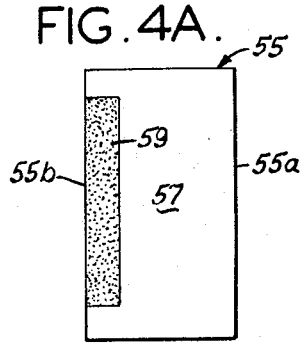
Figure 6:
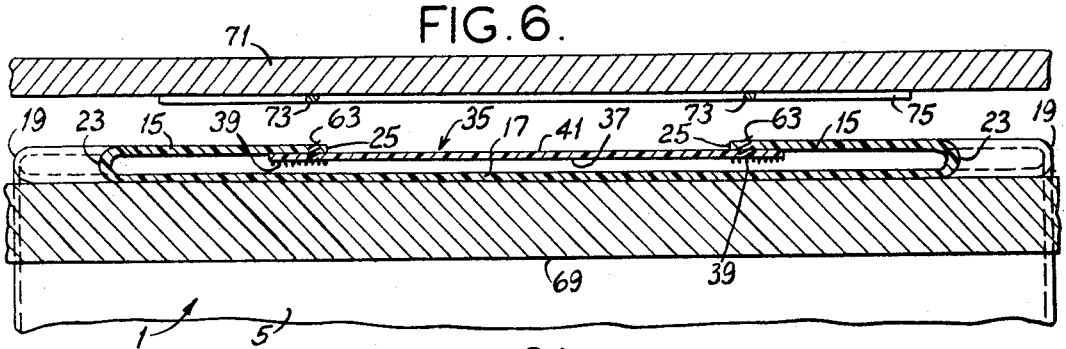
Figure 6A:
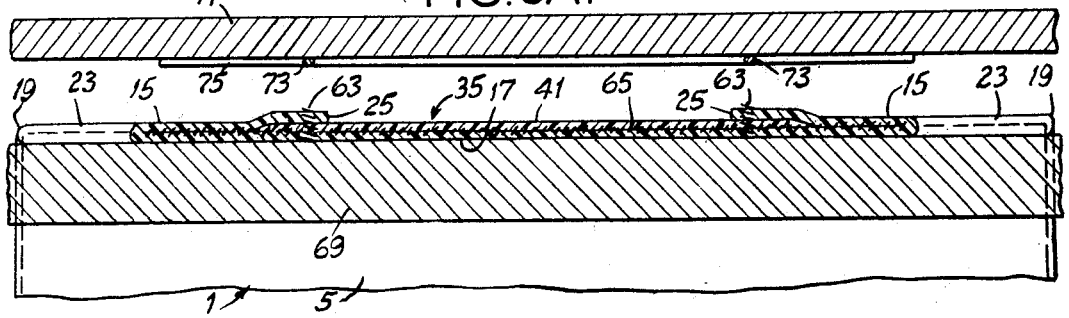
Figure 8:
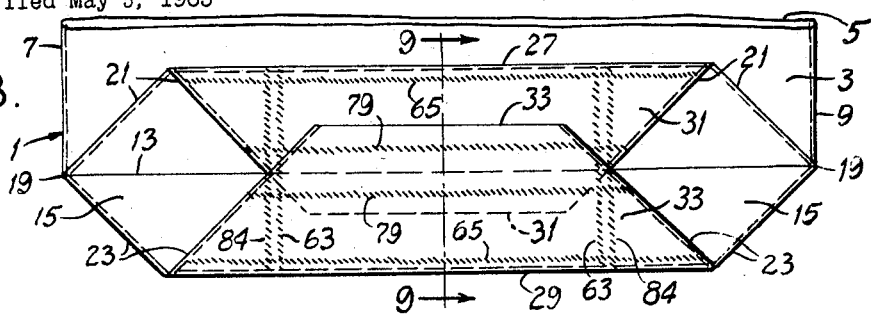
Figure 9:
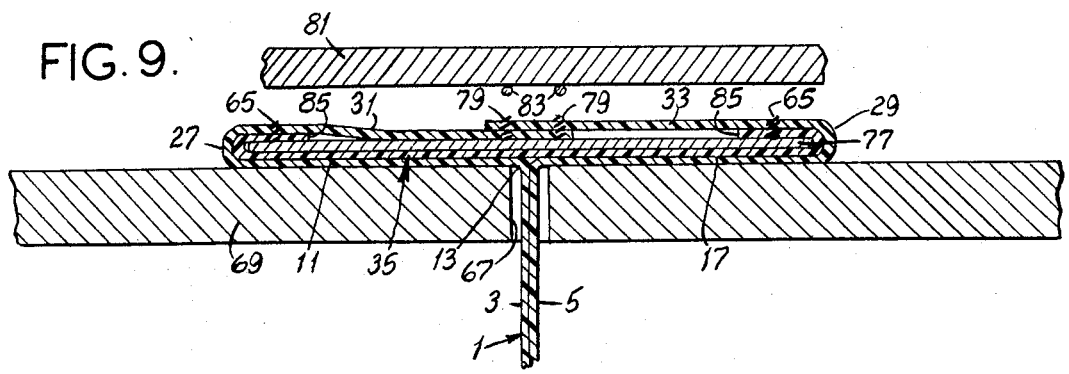
Figure 9A:
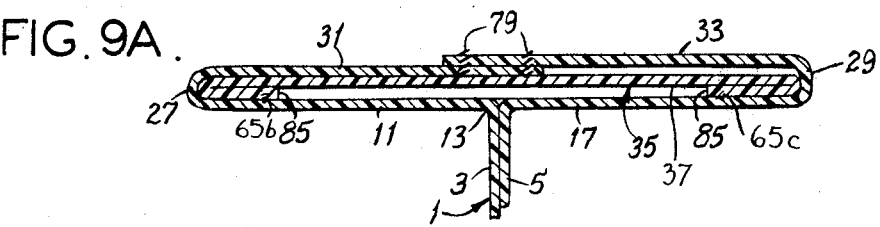
Figure 10:
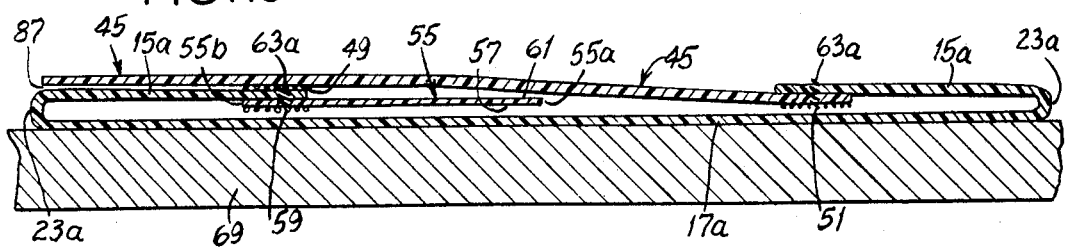
Figure 11:
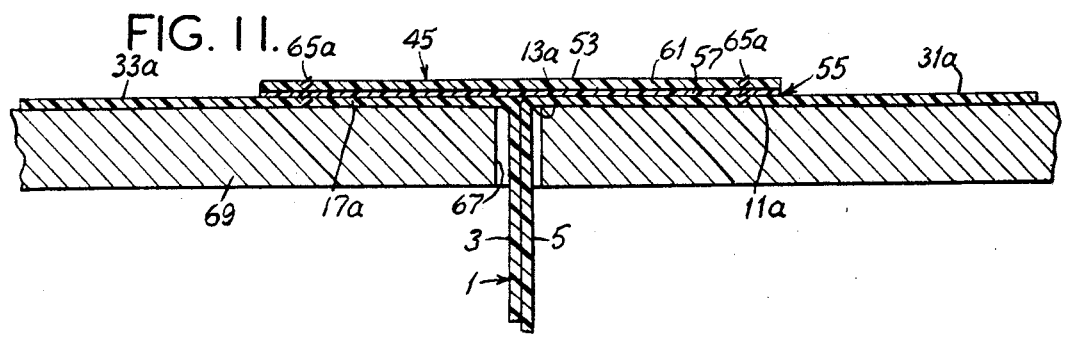
Figure 12:
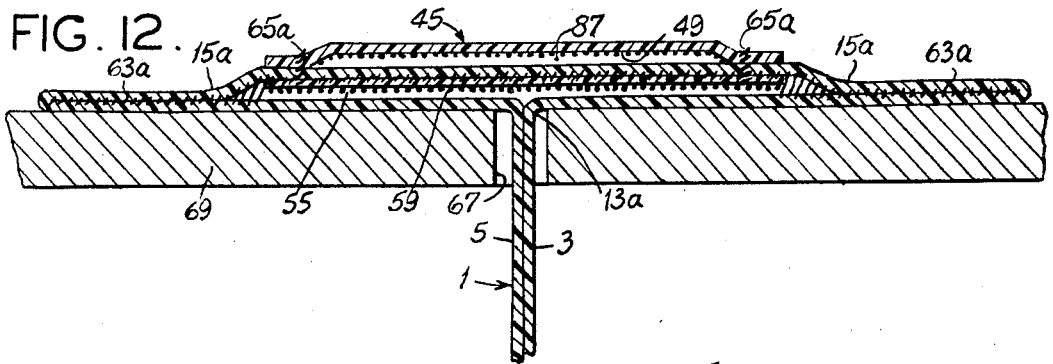
Figure 13:
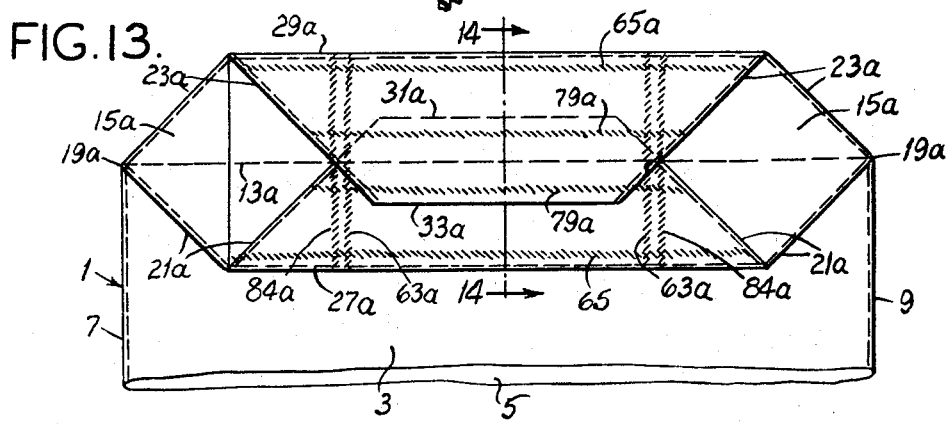
Figure 14:
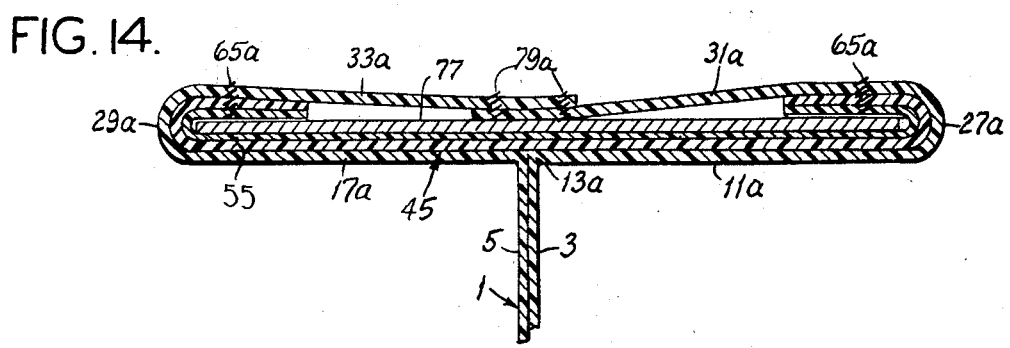
Figure 21:
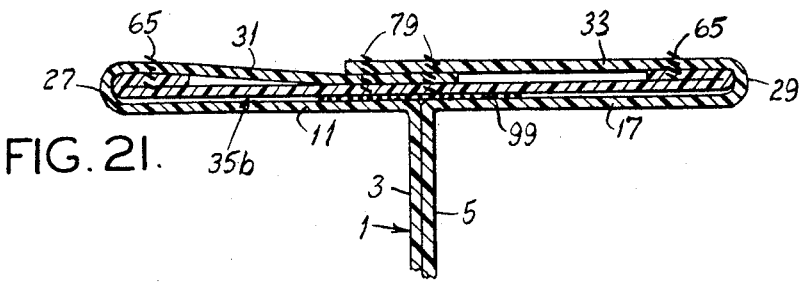
Figure 22:
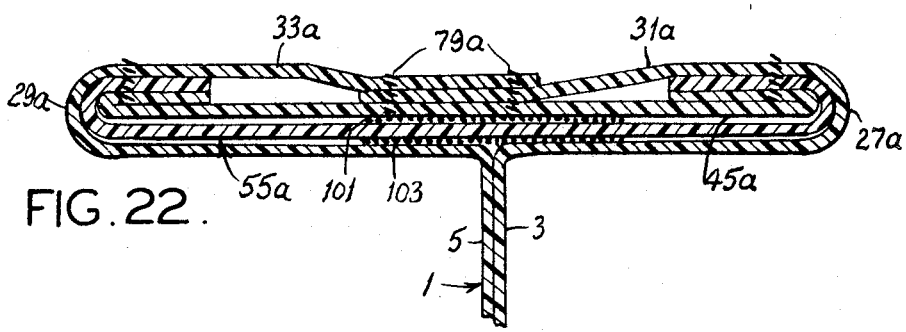
Figure 23:
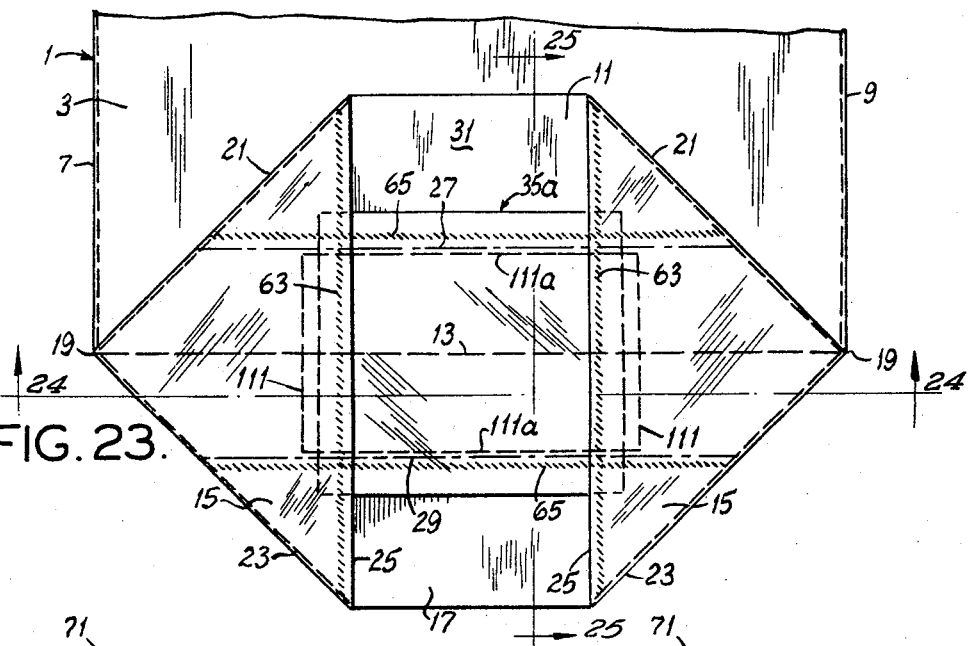
Figure 24:
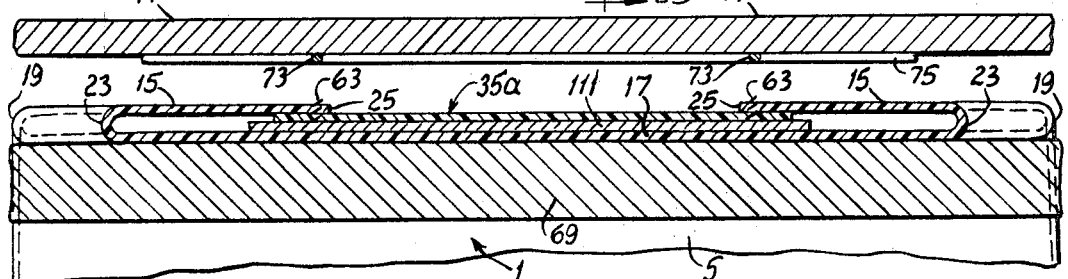
Figure 25:
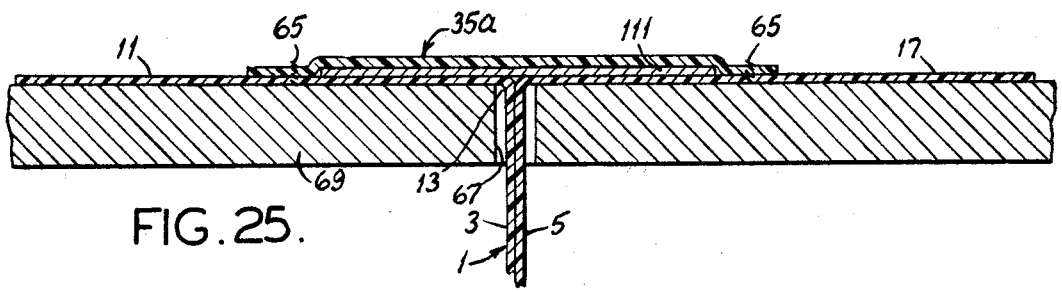

FIGS. 6, 6A and 7 are enlarged sections taken on lines 6—6, 6A—6A and 7—7 of FIG. 5, also showing how the heat seals may be made;

FIG. 8 is a view showing the completed bottom closure;

FIG. 9 is an enlarged section taken on line 9—9 of FIG. 8;

FIG. 9A is a view similar to FIG. 9 showing a modification;

FIGS. 10-12 are enlarged sections taken on lines 10—10, 11—11 and 12—12 of FIG. 5;

FIG. 13 is a view showing the completed top closure;

FIG. 14 is an enlarged section taken on line 14—14 of FIG. 13;

FIG. 15 is a view similar to the lower half of FIG. 1 showing a modification of the bottom closure formation;

FIG. 16 is a view of the lower end of the tube used in making the FIG. 15 modification;

FIG. 17 is an enlarged section taken on line 17—17 of FIG. 15;

FIG. 18 is a view similar to FIG. 2A showing a modification of the FIG. 2A insert;

FIG. 19 is a view similar to FIG. 3A showing a modification of the FIG. 3A insert;

FIG. 20 is a view similar to FIG. 4A showing a modification of the FIG. 4A valve flap;

FIG. 21 is a view similar to FIG. 9 but showing the use of the FIG. 18 insert;

FIG. 22 is a view similar to FIG. 14 but showing the use of the FIG. 19 insert and the FIG. 20 valve flap;

FIG. 23 is a view similar to FIG. 5 showing a modification in the method of manufacture; and FIGS. 24 and 25 are enlarged sections taken on lines 24—24 and 25—25, respectively, of FIG. 23.

Corresponding reference characters indicate corresponding parts throughout the several views of the drawings.

Referring to FIGS. 1, 5, 7–9 and 11–14 of the drawings, there is indicated at 1 a flat bag tube made of flexible heat-sealable sheet plastic material such as polyethylene. The opposed walls of the tube are designated 3 and 5. Wall 3 may be referred to as the front wall and wall 5 as the back wall. The side folds of the tube, which constitute its side edges, are designated 7 and 9. The tube has straight-cut ends. It will be understood that it may be segmented from a continuous length of plastic tubing (e.g., polyethylene) of either the seamed or seamless type.

As shown in FIG. 1, the tube 1 is provided with a diamond-fold bottom closure formation by opening up the lower end of the tube and folding back a lower end portion 11 of the front wall 3 on a fold line 13 extending transversely across the tube. This operation results in the formation of end flaps 15 for the diamond-fold bottom closure and a downward extension 17 of the back wall 5. Each of the end flaps 15 is of triangular form, having an apex 19 at the respective end of fold line 13, the sides of the triangle being constituted by folds 21 and 23 on 45° lines extending from the apex. The inner edges of the triangular flaps 15 are designated 25 and are spaced from one another a distance S as appears in FIG. 1.

Fold lines 27 and 29 are indicated in FIG. 1 extending across portions 11 and 17. These fold lines are spaced equal distances on opposite sides of line 13 and define the width of the completed bottom closure. That part of portion 11 which lies outward of (above) line 27 constitutes a first side flap 31 of the bottom closure formation which is ultimately folded over on line 27, and that part of portion 17 which lies outward of (below) line 29 constitutes a second side flap 33 of the bottom closure formation which is ultimately folded over on line 29, as will appear. As illustrated, the fold lines 27 and 29 are located for lapping of the side flaps 31 and 33 when they are folded over.

Also as shown in FIG. 1, the tube is provided with a diamond-fold top closure formation in the same manner as shown and described for the bottom closure formation, the parts of the top closure formation corresponding to those of the bottom closure formation being designated by the same reference numerals as used for the parts of the bottom closure formation with the letter *a* added.

Now referring to FIGS. 2 and 2A, there is illustrated a rectangular blank or insert of the same heat-sealable sheet plastic material (e.g., polyethylene) as the material of the tube 1, which is used in forming the bottom closure in a manner that will appear. This rectangular insert 35 has an overall length L somewhat greater than the spacing S of the inner end edges 25 of the end flaps and a width W somewhat greater than the spacing of fold lines 27 and 29. It is provided on one face 37 thereof (which face is its inside face as it is assembled with the tube) with stripes 39 (see FIG. 2A) of heat-seal-inhibiting material at the ends thereof, these stripes terminating short of the lengthwise edges of the blank. The heat-seal-inhibiting material used at 39 may be, for example, a commercially available polyamide-base ink printed on the insert. The spacing of the inner edges of stripes 39 generally equals S. The other face 41 of the insert (FIG. 2) is bare (i.e., there is no heat-seal-inhibiting material thereon).

Referring to FIGS. 3 and 3A, there is illustrated a rectangular blank or insert 45 of the same heat-sealable sheet plastic material (e.g., polyethylene) as the material of the tube 1, which is used in forming the top closure in a manner that will appear. This insert 45 has an overall length L1 generally equal to S plus the distance D measured along a fold line 27a or 29a from the end of the fold line to the inner end edge of an end flap 15a plus an overlap 0, and has the same width W as insert 35. It is provided on one face 47 thereof (which face is on the inside as the insert is assembled with the tube) with stripes 49 and 51 of heat-seal-inhibiting material (FIG. 3A), one of these stripes (the stripe 51 as shown) being at one end of the insert and the other stripe 49 being spaced therefrom the distance S. Stripes 49 and 51 terminate short of the lengthwise edges of insert 45. The other face 53 of the insert 45 (FIG. 3) is bare.

Referring to FIGS. 4 and 4A, there is illustrated a rectangular blank 55 of heat-sealable sheet plastic material (e.g., polyethylene) preferably of thinner gauge than the material of tube 1 and blank 45, which, as will appear, provides a valve flap in the completed top closure. The valve flap 55 has a length L2 which is shorter than S plus 0, and a width W. It is provided on one face 57 thereof (which faces in as the valve flap is assembled with the tube) with a stripe 59 of heat-seal-inhibiting material (see FIG. 4A) at one end. This stripe terminates short of the lengthwise edges of the valve flap. The outer face 61 of the valve flap (FIG. 4) is bare. The inner and outer ends of valve flap 55 are designated 55a and 55b.

As shown in FIG. 5, to complete the bottom closure, insert 35 is positioned spanning the inner opposed ends of the triangular end flaps 15 of the bottom closure formation with the striped ends of the insert 35 inserted under the margins of the end flaps 15 with the bare face 41 of the insert facing outward, and hence with the striped face 37 of the insert facing inward (i.e., facing away from the margins of the end flaps 15). The lengthwise center line of the insert is generally registered with line 13 so that the insert extends generally equal distances on opposite sides of line 13. Then, heat seals are made on lines 63 extending generally parallel to the inner end edges 25 of the end flaps 15 and spaced slightly outward from edges 25 of end flaps 15 to effect heat-sealing together of the end flaps and the ends of the insert 35 on intermediate portions of lines 63. Lines 63 extend out beyond the lateral edges of the insert 35 so that the end flaps 15 are heat-sealed directly to the underlying portions of the side flaps 31 and 33 on end portions of lines 63. The lines 63 extend endwise of the stripes 39 of heat-seal-inhibiting material so that the intermediate portions of seals 63 are made only between the end flaps 15 and the insert 35, leaving the insert 35 free of the underlying regions of portions 11 and 17 of the walls of the tube. Also, heat seals are made on lines 65 extending parallel to and somewhat inward of the lateral edges of the insert 35 and continuing over the end flaps 15. The heat seals at 65 seal together the longitudinal margins of the insert 35 and the underlying regions of portions 11 and 17 of the walls of the tube. Heat seals 65 are located slightly outward of fold lines 27 and 29.

In forming the heat seals 63 and 65, the bottom formation is positioned perpendicular to walls 3 and 5 of the tube, the walls being entered in a slot 67 in a table 69 (see FIGS. 6, 6A and 7) and the bottom formation spread out flat on the table. Then the seals at 63 and 65 are made, for example, by moving a platen 71 carrying hot sealing bars or wires 73 and 75 arranged in a pattern for making the seals at 63 and 65 downward to bring the hot bars or wires into pressure engagement with the bottom formation. It will be apparent from FIG. 6 how the heat-seal-inhibiting material at 39 prevents sealing together of the end margins of insert 35 and the underlying layer 17 of material.

After the formation of seals 63 and 65, the side flap 31 is folded over on fold line 27 to overlie the end flaps 15 and the side flap 33 is folded over on fold line 29 to overlap the flap 31 as shown in FIGS. 8 and 9. As appears in FIG. 9, this folding over of the side flaps is carried out around the edges of a thin flat heat-seal-inhibiting mandrel 77. This mandrel has a width corresponding to the width desired for the completed bottom closure (i.e., the spacing of lines 27 and 29) and is positioned extending endwise of the closure formation and centered in respect thereto. After the side flaps 31 and 33 have been folded over and lapped, their lapping margins are heat-sealed together on two spaced lines of seal 79 extending across these margins. The seals 79 are made, for example, by moving a platen 81 carrying hot sealing bars or wires 83 for making these seals downward to bring the wires into pressure engagement with the lapping margins of the side flaps. The mandrel separates the side flaps 31 and 33 from the insert 35 and the underlying areas of portions 11 and 17 of the tube walls to prevent the heat seals made on lines 79 from striking through to the insert 35 and these areas, thereby preventing blocking. The mandrel is then removed, and additional heat seals may be made along lines 84 extending parallel to and closely adjacent lines 63 to cause the side flaps 31 and 33 to become sealed to the inner margins of the end flaps, the stripes 39 of heat-seal-inhibiting material preventing striking through of these seals 84 to the underlying areas of portions 11 and 17 of the tube walls.

As appears in FIG. 9, when the side flaps 31 and 33 are folded over, the lateral margins 85 of the insert 35 fold up and over with the side flaps. FIG. 9A shows a possible modification in which the lateral margins of the insert 35 are folded down and under, instead of up and over and are heat-sealed along lines 65b and 65c to portions 11 and 17 of the front wall 3 and back wall 5, respectively. Heat-seal-inhibiting material is provided on face 37 along lateral margins 85 of insert 35 to inhibit sealing of these lateral margins to the insert body when seals 65 are made. In FIG. 9A, the mandrel 77 of FIG. 9 has been removed from between the folded-over side flaps 31 and 33 and the insert 35.

As shown in FIGS. 5 and 10, to complete the top closure (and to provide it with a valve), the valve flap 55 is positioned with its striped end 55b underlying the inner margin of one of the top closure end flaps 15a (the left-hand end flap 15a as shown), with the bare face 61 of the valve flap engaging the inside face of the end flap and the stripe 59 of heat-seal-inhibiting material facing inward. The insert 45 is positioned with its end having stripe 51 thereon underlying the other top closure end flap 15a (the right-hand end flap 15a as shown), with the insert 45 extending over the left-hand top closure end flap 15a, and with stripes 49 and 51 facing inward. Stripe 49 overlies the inner margin of the left-hand end flap. Both valve flap 55 and insert 45 are centered in respect to fold line 13a of the top closure formation.

Then, heat seals are made on lines 63a extending generally parallel to the inner end edges 25a of the top closure end flaps 15a spaced slightly outward from edges 25a to effect sealing together of the inner margin of the right-hand end flap 15a and the right-hand end of the insert 45 on the right-hand line 63a, and to effect sealing together of the inner margin of the left-hand end flap 15a and the left-hand end of valve flap 55 on the left-hand line 63a. Lines 63a (like lines 63) extend out beyond the lateral edges of the insert 45 (and valve flap 55) so that the end flaps 15a are heat-sealed directly to the underlying portions of the side flaps 31a and 33a of the top closure formation on end portions of lines 63a. The lines 63a extend endwise of stripes 49 and 51 of heat-seal-inhibiting material on insert 45, and the left-hand line 63a extends endwise of the stripe 59 of heat-seal-inhibiting material on valve flap 55. Accordingly, the intermediate portion of the right-hand seal 63a is made only between right-hand end flap 15a and the insert 45, sealing of the right-hand end of the insert 45 to the underlying layer of material being prevented by stripe 51 (see FIG. 10). Stripe 49 prevents sealing of insert 45 along the left-hand line 63a to the left-hand end flap 15a to leave an opening 87 for entry of a filling spout underneath the left-hand end portion of the insert 45. Stripe 59 prevents sealing of the left-hand end of valve flap 55 to the underlying layer of material. Also, heat seals are made on lines 65a (corresponding to lines 65) extending parallel to and slightly inward of the lateral edges of insert 45 and valve flap 55 and continuing over the end flaps 15a. The heat seals at 65a seal together the lateral margins of the insert 45 and valve flap 55 and the underlying regions of portions 11a and 17a of the walls of the tube 1, and are located slightly outward of fold lines 27a and 29a of the top closure formation.

In forming the heat seals 63a and 65a, the top closure formation is positioned perpendicular to walls 3 and 5 of the tube, and entered in slot 67 of table 69, and the seals are made in the same manner as above described in connection with seals 63 and 65.

After the forming of seals 63a and 65a, the side flap 31a of the top closure formation is folded over on fold line 27a to overlie the end flaps 15a and the side flap 33a is folded over on fold line 29a to overlap the flap 31a as shown in FIGS. 13 and 14. As appears in FIG. 14, this folding over of the side flaps 31a and 33a is carried out around the edges of heat-seal-inhibiting mandrel 77 (as above described) applied on top of the insert 45. After the side flaps 31a and 33a have been folded over and lapped, their lapping margins are heat-sealed together on lines 79a (corresponding to lines 79) in the same manner as above described in connection with lines 79. The mandrel separates the side flaps 31a and 33a from the insert 45 and valve flap 55 and the underlying areas of portions 11a and 17a of the tube walls to prevent the seals made on lines 79a from striking through to these areas, thereby preventing blocking. The mandrel is then removed, and heat seals may be made along lines 84a (corresponding to lines 84) to cause the side flaps 31a and 33a to become sealed adjacent their right ends to the right-hand end flap 15a, and to cause the side flaps 31a and 33a to become sealed adjacent their left ends to insert 45, blocking being prevented by stripes 49 and 51.

FIGS. 15–17 illustrate a modification of the bottom closure described above, which is similar to the latter, except that the insert for the bottom closure, which is designated 35a to distinguish it from the insert 35, is positioned spanning the inner opposed ends of the triangular end flaps 15 with the ends of the insert overlying (instead of underlying) the inner end margins of the end flaps 15. In this modification, the insert 35a does not have any heat-seal-inhibiting material, and the tube 1 is preliminarily prepared with stripes 39a of heat-seal-inhibiting material on the inside at the corners thereof, these stripes 39a serving the same purpose as stripes 39 of insert 35.

FIG. 18 shows a modified version 35b of the insert 35 adapted for forming the bottom closure without the use of the mandrel 77. Insert 35b is essentially identical to insert 35 with the addition of a broad longitudinal central stripe 99 of heat-seal-inhibiting material on the face 37 of the insert. This makes the pattern of heat-seal-inhibiting material on face 37 in the form of an H. This same stripe 99 may be used on the insert 35a of FIG. 15.

FIG. 19 shows a modified version 45a of the insert 45 and FIG. 20 shows a modified version 55a of the valve flap 55 adapted for forming the top closure without the use of the mandrel 77. Insert 45a is essentially identical to insert 45 with the addition of a broad longitudinal central stripe 101 of heat-seal-inhibiting material extending between stripes 49 and 51 on the face 47 of the insert, making the pattern of heat-seal-inhibiting material on face 47 in the form of an H. Valve flap 55a is essentially identical to insert 55 with the addition of a broad longitudinal central stripe 103 of heat-seal-inhibiting material on face 57 of the valve flap, making the pattern of heat-seal-inhibiting material on face 57 in the form of a T.

FIG. 21 shows how the stripe 99, while allowing heat-sealing together at 79 of the lapping margins of side flaps 31 and 33 of the bottom closure and the insert 35b, as may be desirable, prevents striking through of seals 79 to portions 11 and 17 of the walls of the tube, thereby to prevent blocking.

FIG. 22 shows how the stripe 101 on insert 45a of the top closure, while allowing heat-sealing together at 79 of the lapping margins of the side flaps 31a and 33a of the top closure and the insert 45a, as may be desirable, prevents striking through of seals 79 to the valve flap 55a, and further shows how stripe 103 on valve flap 55a, prevents sealing together of the valve flap and portions 11a and 17a of the walls of the tube on lines 79, thereby to prevent blocking.

FIGS. 23–25 shows a modification of the method of forming a closure at one end of the tube 1 in which inhibition of heat-sealing to prevent blocking of the closure is effected by means of a heat-seal-inhibiting mandrel rather than by providing heat-seal-inhibiting material on the insert or on the tube. FIG. 23 shows the lower end of the tube opened up in the same manner as shown in FIGS. 1 and 5 and having an insert 35a applied thereto in the same manner as insert 35 is applied in FIG. 5. Insert 35a is the same as insert 35 except that it has no heat-seal-inhibiting material thereon. As shown in FIG. 23, seals are made on lines 63 and 65, the same as in FIG. 5, but, before making these seals, a heat-seal-inhibiting mandrel 111 is positioned underneath the insert (see particularly FIGS. 24 and 25) to prevent striking through of the heat-sealing on the intermediate portions of seals 63 so that the intermediate portions of these seals are made only between the end flaps 15 and the insert 35a, leaving the insert free of the underlying regions of portions 11 and 17 of the walls of the tube. Note particularly from FIGS. 23 and 24 how the end portions of the mandrel 111 are interposed between the end margins of insert 35a and the underlying layer 17 of material to prevent seals 63 from striking through to layer 17 in the regions of seals 63 between lines 27 and 29. For this purpose, mandrel 111 is of rectangular form, having a length sufficiently greater than the spacing of the inner opposed edges 25 of the end flaps 15 to extend beyond the locations of the lines of seal 63, and a width approximating the spacing of fold lines 27 and 29. The mandrel is positioned in centered relation with respect to the closure formation so that its ends lie under the ends of the insert and its lengthwise edges 111a lie along the locations of fold lines 27 and 29 to lie inward of the lines of seal 65 and to permit the folding over of side flaps 31 and 33 around the lengthwise edges of the mandrel. The closure is completed in the same manner as previously described in connection with FIGS. 8 and 9, using mandrel 77, leaving mandrel 111 in place until the seals 79 and 84 have been made.

The method shown in FIGS. 23–25 may be used for forming a bottom closure only, in which case the mandrel 111 is removed through the open upper end of the tube. It may also be used in forming both a bottom closure and valved top closure, in which case the mandrel 111 used for forming the bottom closures may be removed before the valved top closure is formed, and the mandrel used in forming the valved top closure may be removed through the valve.

It will be understood that each of the mandrels 77 and 111 may consist, for example, of a thin sheet metal plate coated with any conventional heat-seal-inhibiting material, such as a polymerized tetrafluoroethylene sold under the trade name Teflon by E. I. du Pont de Nemours & Co., or a sheet of Teflon per se, or the like.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of making a closure at one end of a bag tube of flexible heat-sealable sheet plastic material comprising folding back a portion of one wall of the tube on a first fold line extending transversely across said wall to provide an end closure formation comprising end flaps having their inner ends spaced from one another and side flaps adapted to be folded over on second and third fold lines located on opposite sides of said first fold line, positioning an insert of flexible heat-sealable sheet plastic material to span the inner ends of the end flaps and lapping the inner end margins of the end flaps, forming a heat seal on a line extending generally parallel to the inner end edge of one of said end flaps and spaced outward therefrom to seal said one end flap and the insert together along said line of seal while inhibiting blocking of said closure formation in the region where said one end flap and the insert are heat-sealed together along said line of seal, forming heat seals on lines extending parallel to and spaced inward from the lateral edges of the insert, folding over said side flaps on said second and third fold lines, and heat-sealing said side flaps together while inhibiting blocking of the closure formation where said side flaps are heat-sealed.

2. The method of claim 1 wherein blocking of said closure formation in the region where said one end flap and the insert are heat-sealed together is inhibited by providing heat-seal-inhibiting material in said region.

3. The method of claim 1 wherein blocking of said closure formation in the region where said one end flap and the insert are heat-sealed together is inhibited by providing a heat-seal-inhibiting mandrel under said insert.

4. The method of claim 1 further comprising forming a heat seal on a line extending generally parallel to the inner end edge of the other end flap and spaced outward therefrom to seal said other end flap and the insert together along this line of seal while inhibiting blocking of said closure formation in the region where said other end flap and the insert are heat-sealed together along this line of seal.

5. The method of claim 4 wherein the insert is positioned with its ends underlying the inner end margins of the end flaps, and said insert is initially prepared with heat-seal-inhibiting material at its ends on its inside face.

6. The method of claim 4 wherein the insert is positioned with its ends overlying the inner end margins of the end flaps, and the tube is initially prepared with heat-seal-inhibiting material at its corners in position to come on the inside faces of the inner end margins of the end flaps.

7. The method of claim 4 wherein blocking of said closure formation in the regions where the end flaps and insert are heat-sealed together is inhibited by providing a heat-seal-inhibiting mandrel under said insert.

8. The method of claim 1 wherein inhibition of blocking of the closure formation where the side flaps are heat-sealed is carried out by positioning a heat-seal-inhibiting mandrel underneath the folded-over side flaps.

9. The method of claim 1 wherein inhibition of blocking of the closure formation where the side flaps are heat-sealed is carried out by initially preparing the insert with heat-seal-inhibiting material on that face thereof which is on the inside when the insert is positioned on the closure formation.

10. The method of claim 1 wherein the insert is positioned to extent out over the other end flap and a heat seal is made on a line extending generally parallel to the inner end edge of the other end flap, the insert being initially prepared with heat-seal-inhibiting material in the region of the latter line of seal to prevent heat-sealing of the insert to the said other end flap along said line.

11. The method of claim 10 wherein a valve flap is positioned with one end lapping the inner end margin of said other end flap and with the valve flap extending inward from the inner end margin of said other end flap and heat-sealed to the latter.

12. The method of making a closure at one end of a bag tube of flexible heat-sealable sheet plastic material comprising forming an end closure formation by folding back a portion of one wall of the tube on a first fold line extending transversely across said wall to provide end flaps having their inner ends spaced from one another and side flaps adapted to be folded over on second and third fold lines located on opposite sides of said first fold line, said end closure formation having incorporated therein an insert of flexible heat-sealable sheet plastic material spanning the inner ends of the end flaps and lapping the inner end margins of the end flaps, said insert being heat-sealed to the walls of the tube on lines extending parallel to and spaced inward from the lateral edges of the insert, forming a heat seal on a line extending generally parallel to the inner end edge of one of said end flaps and spaced outward therefrom to seal said one end flap and the insert together along said line of seal while inhibiting blocking of said closure formation in the region where said one end flap and the insert are heat-sealed together along said line of seal, folding over said side flaps on said second and third fold lines, and heat-sealing said side flaps together while inhibiting blocking of the closure formation where said side flaps are heat-sealed.

13. The method of claim 12 wherein blocking of said closure formation in the region where said one end flap and the insert are heat-sealed together is inhibited by providing heat-seal-inhibiting material in said region.

14. The method of claim 12 wherein blocking of said closure formation in the region where said one end flap and the insert are heat-sealed together is inhibited by providing a heat-seal-inhibiting mandrel under said insert.

15. The method of claim 12 further comprising forming a heat seal on a line extending generally parallel to the inner end edge of the other end flap and spaced outward therefrom to seal said other end flap and the insert together along this line of seal while inhibiting blocking of said closure formation in the region where said other end flap and the insert are heat-sealed together along this line of seal.

16. The method of claim 15 wherein the insert is positioned with its ends underlying the inner end margins of the end flaps, and said insert is initially prepared with heat-seal-inhibiting material at its ends on its inside face.

17. The method of claim 15 wherein the insert is positioned with its ends overlying the inner end margins of the end flaps, and the tube is initially prepared with heat-seal-inhibiting material at its corners in position to come on the inside faces of the inner end margins of the end flaps.

18. The method of claim 15 wherein blocking of said closure formation in the regions where the end flaps and insert are heat-sealed together is inhibited by providing a heat-seal-inhibiting mandrel under said insert.

19. The method of claim 12 wherein inhibition of blocking of the closure formation where the side flaps are heat-sealed is carried out by positioning a heat-seal-inhibiting mandrel underneath the folded-over side flaps.

20. The method of claim 12 wherein inhibition of blocking of the closure formation where the side flaps are heat-sealed is carried out by initially preparing the insert with heat-seal-inhibiting material on that face thereof which is on the inside when the insert is positioned on the closure formation.

21. The method of claim 12 wherein the insert is positioned to extend out over the other end flap and a heat seal is made on a line extending generally parallel to the inner end edge of the other end flap, the insert being initially prepared with heat-seal-inhibiting material in the region of the latter line of seal to prevent heat-sealing of the insert to the said other end flap along said line.

22. The method of claim 21 wherein a valve flap is positoned with one end lapping the inner end margin of said other end flap and with the valve flap extending inward from the inner end margin of said other end flap and heat-sealed to the latter.

References Cited

UNITED STATES PATENTS

| | | | |
|---|---|---|---|
| 3,237,534 | 3/1966 | Lissner | 93—8 |
| 3,272,093 | 9/1966 | Brockmuller | 93—35 |
| 3,343,463 | 9/1967 | Nielsen et al. | 93—35 |
| 3,355,997 | 12/1967 | Heimos et al. | 93—35 |

BERNARD STICKNEY, *Primary Examiner.*